(12) United States Patent
Rodriguez et al.

(10) Patent No.: US 10,931,828 B2
(45) Date of Patent: *Feb. 23, 2021

(54) VOIP ANALOG TELEPHONE SYSTEM

(71) Applicant: NetTALK.com, Inc., Miami Gardens, FL (US)

(72) Inventors: Mark F. Rodriguez, North Miami, FL (US); Anastasios Takis Kyriakides, North Miami, FL (US); Kenneth Hosfeld, North Miami, FL (US); Leo Manzewitsch, North Miami, FL (US); Garry M. Paxinos, North Miami, FL (US); Nicholas Kyriakides, North Miami, FL (US)

(73) Assignee: NetTALK.com, Inc., Miami Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,733

(22) Filed: Jun. 17, 2019

(65) Prior Publication Data

US 2019/0306323 A1    Oct. 3, 2019

Related U.S. Application Data

(63) Continuation of application No. 15/606,378, filed on May 26, 2017, now Pat. No. 10,326,887, which is a
(Continued)

(51) Int. Cl.
*H04M 7/00* (2006.01)
*H04L 29/06* (2006.01)
(Continued)

(52) U.S. Cl.
CPC .......... *H04M 7/0069* (2013.01); *H04L 12/10* (2013.01); *H04L 29/06387* (2013.01);
(Continued)

(58) Field of Classification Search
CPC ............. H04M 7/0069; H04M 1/0293; H04M 1/2335; H04M 1/738; H04M 1/0289;
(Continued)

(56) References Cited

U.S. PATENT DOCUMENTS 7,346,368 B2    3/2008  Llanos ........................ 455/550.1
7,372,851 B2    5/2008  Boutboul ....................... 370/356
(Continued)

OTHER PUBLICATIONS

Dosch & Amand Research Data Sheet 1200-101-0106 VoIP WLAN Router + DECT. © 2005-2006, 3 pages.
(Continued)

*Primary Examiner* — Candal Elpenord
(74) *Attorney, Agent, or Firm* — Niro McAndrews, LLP

(57) ABSTRACT

A multi-port VoIP telecommunications system that allows the user to gain access to telephone connectivity through the Internet by connecting directly to the Internet or by connecting to the Internet through the existing Internet connection of a computer or cell phone device. The present system includes an Ethernet port, a Wi-Fi receiver to facilitate the transmission and receipt of Internet protocol signals wirelessly, a USB plug connectable to the ATA, connectivity to a home monitoring network and connectivity to Bluetooth devices.

20 Claims, 8 Drawing Sheets

Related U.S. Application Data continuation of application No. 15/344,789, filed on Nov. 7, 2016, now Pat. No. 9,667,800, which is a continuation of application No. 14/809,945, filed on Jul. 27, 2015, now Pat. No. 9,491,304, which is a continuation of application No. 13/584,750, filed on Aug. 13, 2012, now abandoned, which is a continuation-in-part of application No. 12/366,851, filed on Feb. 6, 2009, now Pat. No. 8,243,722.

(51) Int. Cl.

| | | |
|---|---|---|
| H04M 1/253 | (2006.01) | |
| H04M 11/04 | (2006.01) | |
| H04L 12/10 | (2006.01) | |
| H04M 3/42 | (2006.01) | |
| H04M 1/02 | (2006.01) | |
| H04M 1/738 | (2006.01) | |

(52) U.S. Cl.
CPC ...... *H04L 65/1059* (2013.01); *H04L 65/1069* (2013.01); *H04L 65/4007* (2013.01); *H04M 1/0289* (2013.01); *H04M 1/0293* (2013.01); *H04M 1/2535* (2013.01); *H04M 1/738* (2013.01); *H04M 3/42161* (2013.01); *H04M 11/04* (2013.01); *H04M 2242/04* (2013.01); *H04M 2250/02* (2013.01)

(58) Field of Classification Search
CPC ............. H04M 3/42161; H04M 11/04; H04M 2250/02; H04M 2242/04; H04L 29/06387; H04L 65/1059; H04L 65/4007; H04L 65/1069; H04L 12/10

See application file for complete search history.

(56) References Cited

U.S. PATENT DOCUMENTS

| | | | | |
|---|---|---|---|---|
| 7,463,615 | B2 | 12/2008 | Vassilovski | 370/342 |
| 7,596,124 | B2 | 9/2009 | Brenes | 370/338 |
| 8,121,132 | B2* | 2/2012 | Binder | H04L 12/40 370/254 |
| 8,125,999 | B2 | 2/2012 | Yasrebi | 370/401 |
| 2002/0057682 | A1 | 5/2002 | Hansen | 370/386 |
| 2004/0073820 | A1 | 4/2004 | Hsu | 713/300 |
| 2004/0218583 | A1 | 11/2004 | Adan | 370/352 |
| 2005/0083959 | A1* | 4/2005 | Binder | H04M 7/006 370/419 |
| 2005/0105512 | A1 | 5/2005 | Myhre | 370/352 |
| 2005/0243750 | A1 | 11/2005 | Jurascheck | 370/312 |
| 2005/0271029 | A1 | 12/2005 | Iffland | 370/348 |
| 2006/0077968 | A1 | 4/2006 | Pitsoulakis | 370/352 |
| 2006/0092831 | A1 | 5/2006 | Hartnett | 370/217 |
| 2006/0171378 | A1 | 8/2006 | Harris | 370/352 |
| 2006/0187904 | A1 | 8/2006 | Oouchi | 370/352 |
| 2006/0280132 | A1 | 12/2006 | Connor | 370/276 |
| 2007/0002837 | A1 | 1/2007 | Tan | 370/352 |
| 2007/0104085 | A1 | 5/2007 | Sambhwani | 370/203 |
| 2007/0140262 | A1 | 6/2007 | Wang | 370/395.52 |
| 2007/0189270 | A1 | 8/2007 | Borislow | 370/352 |
| 2007/0189271 | A1 | 8/2007 | Borislow | 370/352 |
| 2007/0286173 | A1 | 12/2007 | Li | 370/356 |
| 2008/0031273 | A1 | 2/2008 | Wang | 370/444 |
| 2008/0056245 | A1 | 3/2008 | Boutboul | 370/356 |
| 2008/0112392 | A1 | 5/2008 | Mansfield | 370/352 |
| 2009/0154337 | A1 | 6/2009 | Kim | 370/216 |
| 2009/0190583 | A1 | 7/2009 | Accetta | 370/389 |
| 2009/0252054 | A1 | 10/2009 | Barkan | 370/252 |
| 2009/0296625 | A1 | 12/2009 | Wu | 370/315 |
| 2009/0323673 | A1 | 12/2009 | Gabbay | 370/352 |
| 2010/0035650 | A1 | 2/2010 | Gottehrer | 455/558 |
| 2010/0074190 | A1 | 3/2010 | Cordeiro | 370/329 |

OTHER PUBLICATIONS

Linksys Wireless-G Broadband Router with 2 Phone Ports. User Guide Model No. WRP400. 49 pages.
Cisco Small Business WRP400 Wireless-G Broadband Router with 2 Phone Ports, User Guide, © 2009, 155 pages.
Cisco WRP400 Wireless-G Broadband Router with 2 Phone Ports, Data Sheet, © 2008-2009, 6 pages.
Cisco Small Business Pro WRP400 Wireless-G Broadband Router with 2 Phone Ports and Built-in Analog Telephone Adapter. © 2009, 173 pages.
Cisco WRP400 Wireless-G Broadband Router with 2 Phone Ports Quick Start Guide, © 2009, 2 pages.
Draytek Vigor 2910 Series Readme File, Captured by the Internet Archive on Oct. 11, 2007, 2 pages.
DrayTEL Broadband Phone Calling User Guide, Captured by the Internet Archive on Feb. 8, 2007, 10 pages.
DrayTel Broadband Phone Calling, Captured by the Internet Archive on Feb. 27, 2007, 2 pages.
DrayTek Vigor 2910 / Vigor 2910VG Router Dual-WAN Security Firewall & VPN Device, Captured by the Internet Archive on Aug. 18, 2007, 5 pages.
DrayTek General Router FAQ, Captured by the Internet Archive on May 23, 2007, 3 pages.
DrayTek Vigor2910 Dual-WAN Security Router User's Guide, Version 3.0, May 16, 2007, 223 pages.
Vigor 2950 Security Firewall, Captured by the Internet Archive on Jul. 28, 2007, 1 page.
G Wireless Adapters, Captured by the Internet Archive on Aug. 24, 2006, 2 pages.
"Installation, Configuration and Operation of Fritz!Box Fon Ata," Manual AVMGmbH, Jun. 2005, 87 Pages.
Ex Parte Reexamination 90/012,634 of U.S. Pat. No. 8,243,722—Request for Reexamination on Sep. 14, 2012, 43 pages.
Ex Parte Reexamination 90/012,634 of U.S. Pat. No. 8,243,722—Determiniation ordering Reexamination on Nov. 15, 2016, 22 pages. (Note: Copy not provided as this is a PTO-issued document and in the PTO files).
Ex Parte Reexamination 90/012,634 of U.S. Pat. No. 8,243,722—Non-Final Action dated Mar. 15, 2013, 13 pages. (Note: Copy not provided as this is a PTO-issued document and in the PTO files).
Ex Parte Reexamination 90/012,634 of U.S. Pat. No. 8,243,722—Examiner Interview Summary Record dated May 1, 2013.4 pages. (Note: Copy not provided as this is a PTO-issued document and in the PTO files).
Ex Parte Reexamination 90/012,634 of U.S. Pat. No. 8,243,722—Final Action dated Aug. 15, 2013, 20 pages. (Note: Copy not provided as this is a PTO-issued document and in the PTO files).
Ex Parte Reexamination 90/012,634 of U.S. Pat. No. 8,243,722—Advisory Action dated Nov. 13, 2013, 4 pages. (Note: Copy not provided as this is a PTO-issued document and in the PTO files).
Ex Parte Reexamination 90/012,634 of U.S. Pat. No. 8,243,722—Notice of Intent to Issue a Reexam Certificate dated Dec. 19, 2013, 12 pages. (Note: Copy not provided as this is a PTO-issued document and in the PTO files).
*NetTalk.com, Inc.* v. *Magicjack LP*, Magicjack holdings corporation, and Daniel Borislow, "Complaint for Patent Infringement," filed with the United States District Court for the Southern District of Florida West Palm Beach Division, case No. 9:12-CV-81022, filed Sep. 21, 2012, 11 pages.
*NetTalk.com, Inc.* v. *Magicjack LP*, Magicjack holdings corporation, and Daniel Borislow, "Defendants' Motion to Stay," filed with the United States District Court for the Southern District of Florida West Palm Beach Division, case No. 9:12-CV-81022, filed Nov. 8, 2012, 13 pages.
*NetTalk.com, Inc.* v. *Magicjack LP*, Magicjack holdings corporation, and Daniel Borislow, "Defendants' Motion to Dismiss," filed with the United States District Court for the Southern District of Florida West Palm Beach Division, case No. 9:12-CV-81022, filed Nov. 13, 2012, 21 pages.
*NetTalk.com, Inc.* v. *Magicjack LP*, Magicjack holdings corporation, and Daniel Borislow, "Response in Opposition to Defendants' Motion to Stay," filed with the United States District Court for the

(56) References Cited

OTHER PUBLICATIONS

Southern District of Florida West Palm Beach Division, case No. 9:12-CV-81022, filed Nov. 26, 2012, 12 pages.

*NetTalk.com, Inc.* v. *Magicjack LP*, Magicjack holdings corporation, and Daniel Borislow, "Response in Opposition to Defendants' Motion to Dismiss," filed with the United States District Court for the Southern District of Florida West Palm Beach Division, case No. 9:12-CV-81022, filed Dec. 3, 2012, 17 pages.

*NetTalk.com, Inc.* v. *Magicjack LP*, Magicjack holdings corporation, and Daniel Borislow, "Reply to Response to Motion to Defendants Motion to Stay," filed with the United States District Court for the Southern District of Florida West Palm Beach Division, case No. 9:12-CV-81022, filed Dec. 6, 2012, 12 pages.

*NetTalk.com, Inc.* v. *Magicjack LP*, Magicjack holdings corporation, and Daniel Borislow, "Reply to Response to Motion to Defendants Motion to Dismiss," filed with the United States District Court for the Southern District of Florida West Palm Beach Division, case No. 9:12-CV-81022, filed Dec. 13, 2012, 13 pages.

*NetTalk.com, Inc.* v. *Magicjack LP*, Magicjack holdings corporation, and Daniel Borislow, "Amended Complaint," filed with the United States District Court for the Southern District of Florida West Palm Beach Division, case No. 9:12-CV-81022, filed Mar. 20, 2014, 16 pages.

*NetTalk.com, Inc.* v. *Magicjack LP*, Magicjack holdings corporation, and Daniel Borislow, "Plaintiff's Opening Claim Construction Brief," filed with the United States District Court for the Southern District of Florida West Palm Beach Division, case No. 9:12-CV-81022, filed Jun. 24, 2014, 20 pages.

*NetTalk.com, Inc.* v. *Magicjack LP*, Magicjack holdings corporation, and Daniel Borislow, "Defendants' Opposition to Plaintiff's Opening Claim Construction Brief," filed with the United States District Court for the Southern District of Florida West Palm Beach Division, case No. 9:12-CV-81022, filed Jul. 8, 2014, 27 pages.

*NetTalk.com, Inc.* v. *Magicjack LP*, Magicjack holdings corporation, and Daniel Borislow, "Answer to Amended Complaint," filed with the United States District Court for the Southern District of Florida West Palm Beach Division, case No. 9:12-CV-81022, filed Jul. 11, 2014, 23 pages.

*NetTalk.com, Inc.* v. *Magicjack LP*, Magicjack holdings corporation, and Daniel Borislow, "Plaintiff's Reply to Defendants' Opposition to Plaintiff's Opening Claim Construction Brief," filed with the United States District Court for the Southern District of Florida West Palm Beach Division, case No. 9:12-CV-81022, filed Jul. 16, 2014, 12 pages.

*NetTalk.com, Inc.* v. *Magicjack LP*, Magicjack holdings corporation, and Daniel Borislow, "Defendants' Sur-Reply in Support of their Opposition to Plaintiff's Opening Claim Construction Brief," filed with the United States District Court for the Southern District of Florida West Palm Beach Division, case No. 9:12-CV-81022, filed Jul. 29, 2014, 13 pages.

*NetTalk.com, Inc.* v. *Magicjack LP*, Magicjack holdings corporation, and Daniel Borislow, "Transcript of Markman Hearing held on Aug. 29, 2014 before Judge Darrin P. Gayles," filed with the United States District Court for the Southern District of Florida West Palm Beach Division, case No. 9:12-CV-81022, filed Sep. 11, 2014, 209 pages.

*NetTalk.com, Inc.* v. *Magicjack LP*, Magicjack holdings corporation, and Daniel Borislow, "Order on Claims Construction," filed with the United States District Court for the Southern District of Florida West Palm Beach Division, case No. 9:12-CV-81022, filed Dec. 1, 2014, 13 pages.

International Preliminary Report on Patentability for PCT Application PCT/US2010/022084 dated Aug. 9, 2011, 7 pages.

Written Opinion of the International Searching Authority for PCT Application PCT/US2010/022084 dated Mar. 8, 2010, 6 pages.

International Search Report for PCT Application PCT/US2010/022084 dated Jan. 26, 2010, 2 pages.

* cited by examiner

US 10,931,828 B2

VOIP ANALOG TELEPHONE SYSTEM

CROSS-REFERENCE TO COPENDING APPLICATION

This application is a continuation of U.S. patent application Ser. No. 15/606,378 that was filed on May 26, 2017 and entitled "VoIP Analog Telephone System," a continuation of U.S. patent application Ser. No. 15/344,789 filed on Nov. 7, 2016 and entitled "VoIP Analog Telephone System," a continuation of U.S. patent application Ser. No. 14/809,945 filed on Jul. 27, 2015 entitled "VoIP Analog Telephone System," a continuation of U.S. patent application Ser. No. 13/584,750 filed on Aug. 13, 2012 as a continuation-in-part of U.S. patent application Ser. No. 12/366,851, filed on Feb. 6, 2009, the contents of which are all herein incorporated by reference.

FIELD OF THE INVENTION

This invention relates to a telecommunications system for personal phones or residential users that enables Voice over Internet Protocol (VoIP) telephony and facsimile services, and more specifically to a multi-port VoIP telephone system that allows the user to gain access to telephone connectivity through the Internet and utilize an analog telephone handset by transmitting through a device that is connected to the Internet by using an USB (Universal Serial Bus) port of a computer already connected to the internet or by connecting directly to the Internet via an RJ 45 port (or Ethernet port) or an existing Wi-Fi network or any other way to get connected to the Broadband Internet such as Wireless 3G (Third Generation) Services or Bluetooth (the short range wireless connectivity standard).

BACKGROUND OF THE INVENTION

Land line telephone systems that include telephone handsets with wiring that goes through a publicly switched telephone network (PSTN) with a central office for switching are well known in the prior art. The basic technology behind how these systems are delivered has not changed much since its inception. Besides the fact that each individual phone set must be wired to be connected directly to each other individual handset during the telephone communication, the circuit is connected between both of the handsets and through the central office switchboard during the conversation.

Wireless telephony, which includes the use of wireless handsets and networks of cellular antennas, has increased immensely. This has allowed telephone users to connect to each other wirelessly from virtually any location that has access to a cellular network.

VoIP is a general term for a family of transmission technologies for delivery of voice communications over the Internet or other packet-switch networks. Other terms whose meaning is synonymous include IP telephony, Internet telephony, voice over broadband, broadband telephony, and broadband phone, all of which are used when network connectivity is available over broadband internet access. VoIP systems typically interface with traditional PSTN, allowing for transparent telephone communications world wide.

Typically, phones using a VoIP service can work from almost anywhere when connected to a computer that is accessing the Internet. However, some IP networks can be inherently unreliable and not provide a mechanism to ensure that data packets are delivered in sequential order. This can cause problems such as mitigating latency and jitter. Other problems can arise in channel routing VoIP traffic through firewalls and address translators.

In the last few years, VoIP services have begun to be marketed commercially. These services have become more feasible in large part because of the increased availability of broadband internet access. Subscribers to these VoIP services are able to make and receive calls as they would over a traditional PSTN. Full service VoIP phone companies provide inbound and outbound calling with direct inbound dialing.

In one VoIP scenario, an analog telephone adapter (ATA) is connected to and accesses the Internet through a computer with a broadband Internet connection and an existing telephone jack in order to provide service that is very similar to traditional PSTN. This service is typically offered by broadband internet service providers such as cable companies and telephone companies as a cheaper flat rate telephone service.

Another VoIP scenario involves using the signaling protocol Session Initiation Protocol (SIP). SIP is widely used for setting up and tearing down multimedia communication sessions such as voice and video calls over the internet. SIP can be used for creating, modifying, and terminating two party or multi-party sessions consisting of one or more media streams. A motivating goal for SIP was to provide a signaling and call set up protocol for IP based communications that can support a superset of the call processing functions and features present in the PSTN. It is designed to enable the construction of and various functionalities within network elements designated proxy servers and user agents that permit familiar telephone like operations such as dialing a number, causing a phone to ring, hearing ring back tones, or busy signal.

A primary limitation of existing VoIP systems is that they must use a computer in order to establish the requisite connection to the Internet.

What is needed is a VoIP analog telephone system for personal phones and residential users that allows the user to gain access to telephone connectivity by transmitting through the USB port of a computer or other device that is connected to the Internet or by connecting directly to the Internet via an RJ 45 port or an existing Wi-Fi network.

SUMMARY OF THE INVENTION

A multi-port VoIP analog telephone system for connecting personal phones and residential users that includes telephony and facsimile services comprising a conventional telephone or facsimile machine which includes a telephone jack and an ATA device that includes an RJ 45 port and at least one USB port and is connected to the telephone jack. The ATA device can be connected to a computer, a broadband modem through a RJ 45 port or a Wi-Fi router, allowing it to connect to the internet.

In its most basic setup, the system comprises the traditional analog telephone or facsimile machine connected to an ATA. The ATA is powered through its USB port either though a connection to a computer or through power adapter. The ATA can access the Internet directly through an RJ 45 port built in or indirectly by connecting through the ATA's USB port to a computer that is connected to the Internet or a device with access to the Internet through a cell phone network.

In a more advanced setup, the ATA hardware can be supplemented so that the ATA can access to the Internet wirelessly through a Wi-Fi network (or WiMax, or other standard wireless Internet networks) that is locally available or by a Bluetooth wireless connection to a computer already connected to the Internet.

The basic platform for the system includes a central processor, a storage medium, a memory source, a network interface card (NIC), a USB pot, an Internet input, a RJ 11 port (or any telephone port), and a reset switch which is included with an LED. The USB port can be used to input a power source, an Internet connection, or both. CODEC and SLIC circuitry is connected to the processor. The platform also includes an RJ 45 connector and RJ 11.

The user can gain access to telephone connectivity either through the USB port of any computer or cell phone like devices with Internet access, through an RJ 45 port connected to a switch, modem, or router without the need of a computer, or via a built-in Wi-Fi receiver without the need for a computer connection. The wireless connection through cell phone like devices can be through a GSN, EVDO, CODMA, and/or WIMAX network or other wireless networks.

The system also has an option for onboard dialers, ringtones, ring light, port inter phase for normal and/or Bluetooth auto input/output that completely eliminates the need for an external analog telephone device if the user so desires.

The ATA uses a SIP protocol hosted locally to provide the telephony functionality. The telephone system includes normal features such as call hold, call transfer with or without consultation, call waiting, three party conference, call forwarding, do not disturb, speed dial, repeat dial on busy, caller ID number and name, caller ID block, anonymous call rejection, configurable country tones, distinctive ring, hot line, call hunting between extension, speed dial of ten numbers and address, message wait indication, visual message waiting indication, configurable hook flash, adaptive jitter buffer, facsimile (transparent and facsimile relay), 411 information, and advanced voice security features such as RTP.

The system itself is plug-in-play and may have a CD that will help to install drivers on the computer connected to the Internet. The multi-port functional approach is also plug-in-play. The telephone functionality is auto configured and the ATA will take the user configuration from the network. The user sets the user account from a web page. The ATA can be identified by its MAC address and/or a serial number that can be electronically webbed.

It is an object of this invention to provide a VoIP analog telephone system that can be connected to the Internet either directly or indirectly, with the ability to use several means of connecting to establish telephone communications.

It is another object of this invention to provide a VoIP telephone system for personal telephone use that allows for connection to a computer through the USB port wherein the computer does not need an SIP application in order to allow clean computer sharing.

It is another object of this invention to provide a VoIP telephone system that provides unlimited calls to fixed phones throughout the United States, prepaid premium phone features, and VoIP service with any fixed phone, all while using an analog telephone headset.

In accordance with these and other objects which will become apparent hereinafter, the instant invention will now be described with particular reference to the accompanying drawings.

DETAILED DESCRIPTION

Figure 1:
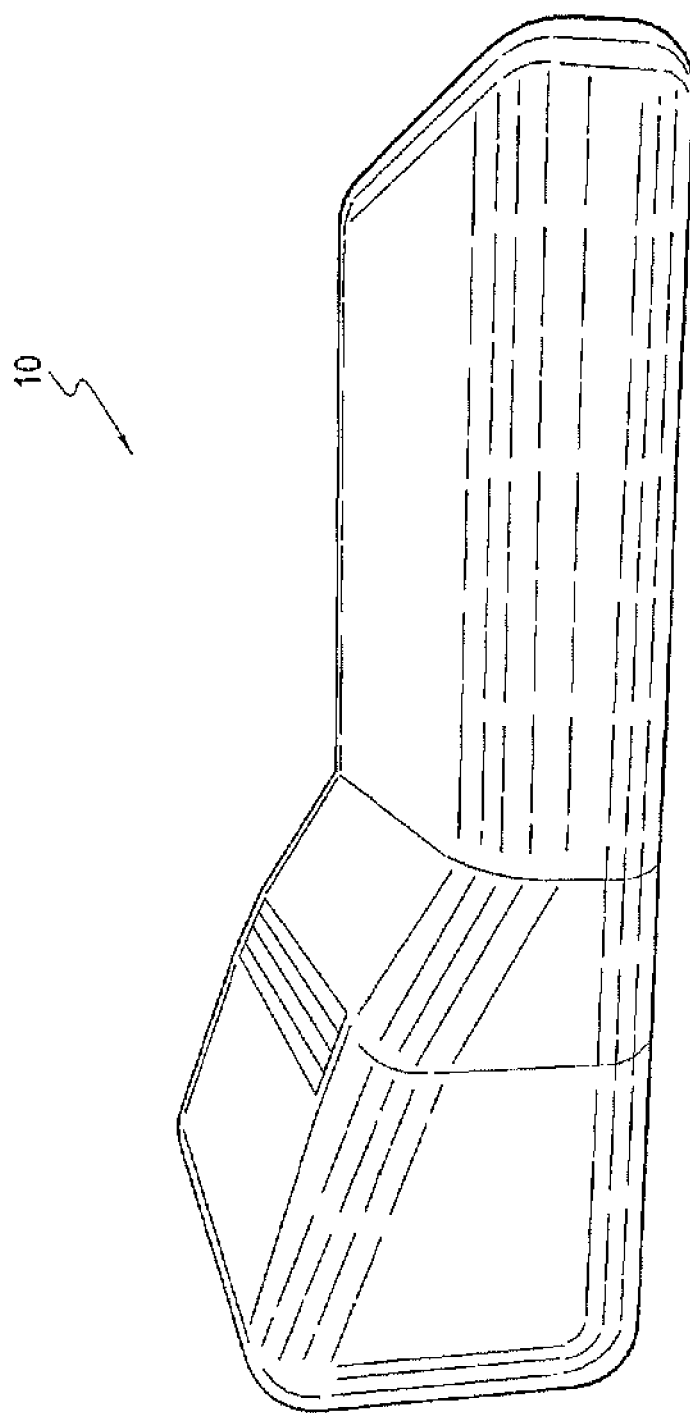
FIG. 1 shows a perspective view of the present invention.
Figure 2:
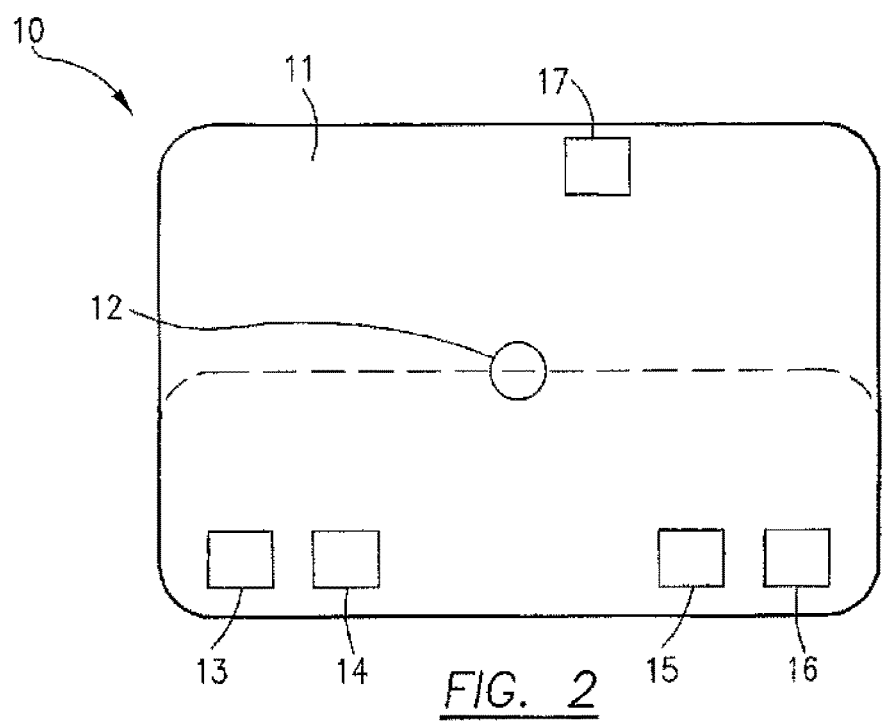
FIG. 2 shows a block diagram of the connections used in the present invention.
Figure 3:
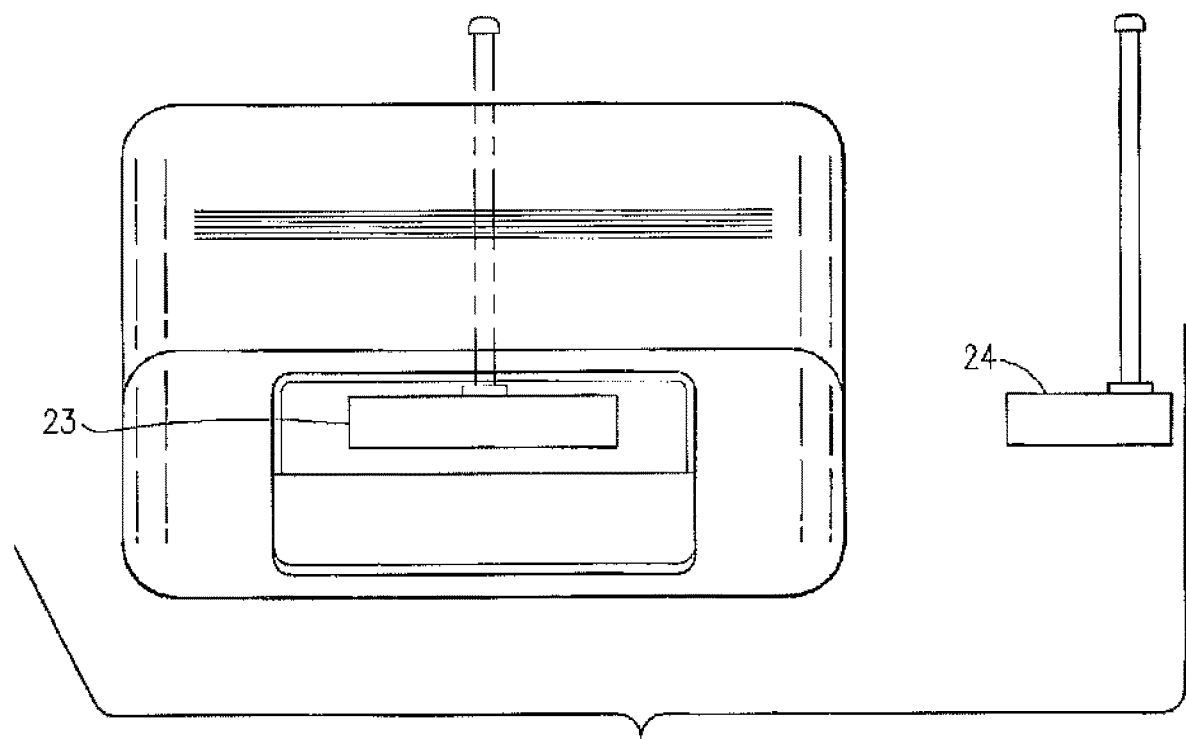
FIG. 3 shows a block diagram of the connections used in the present invention.

Referring now to the drawings and, in particular, FIGS. 1 through 3 the heart of the present invention is the ATA 10, which is a rigid device with a tall end 11 and a short end 20. The tall end 11 houses several of the ports that are needed to enable the numerous functions of the invention. An LED light 12 provides a visual display of the current power and operational state of the ATA 10. The reset button 17, when depressed by a user, shuts down and then immediately restarts the ATA 10. Two USB ports 13, 14 perform the function of providing data input/output as well as power input to the device. An Ethernet port 15 allows an Ethernet cord to be directly connected to the ATA 10 so that the invention can be used without a computer with Internet access. The telephone jack 16 is where the ATA 10 can receive a connection from an analog telephone handset.

The short end 20 of the invention contains a Wi-Fi adapter port 23. In order to enable the ATA 10 to employ a Wi-Fi Internet connection to utilize VoIP service, a Wi-Fi adapter 24 must be inserted into the Wi-Fi adapter port 23. When the Wi-Fi adapter 24 is fully engaged with the Wi-Fi adapter port 23, the ATA will search for available Wi-Fi networks and connect to an available Wi-Fi network.

Figure 4:
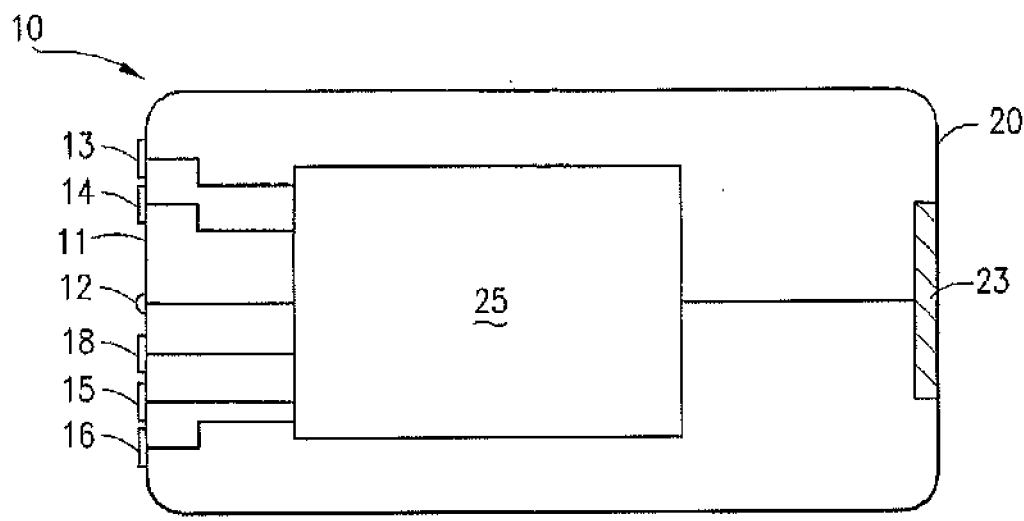
FIG. 4 shows a top plan view of the connections used in the present invention.

Referring now to FIG. 4, the control circuitry 25 in the ATA 10 contain several key components, all of which is mounted on to a platform. The heart of the circuitry components is the central processor 25. The ATA 10 also requires a random access memory component, a NIC component, and a storage medium component. In addition, the storage medium will contain the necessary software to perform the basic VoIP operations, including CODEC, SLIC, and SIP. Each of these components connect work through the processor and the various ports depending upon a particular input from the Internet and output to the Internet that will be achieved from the physical connection to an analog telephone handset.

Figure 5:
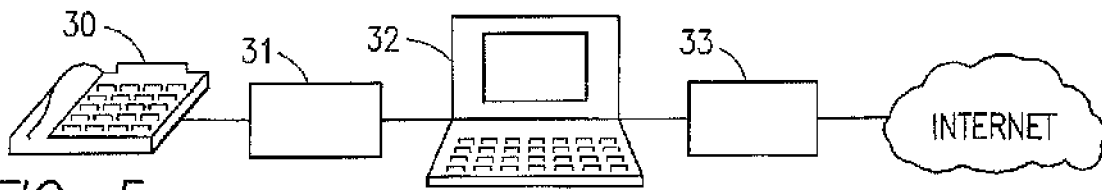
FIG. 5 shows a schematic diagram of the present invention using a USB connection to a computer.

Referring now to FIG. 5, the basic telephone VoIP system is shown that includes an analog telephone handset 30 as one would find in the conventional residence or even commercially. The analog telephone handset 30 is connected to the ATA 31 through the ATA's 31 telephone port (RJ 11 or compatible). The ATA 31 is shown connected to a computer 32 through a USB cord that is connected to the computer 32 and to the USB port on the ATA 31. The computer 32 is shown wired to a modem 33 (or router, modem/router combination device and/or a switch), which the computer is using to obtain access to the Internet. The ATA 31 receives power and accesses the Internet through the computer's 32 existing power supply and Internet access and is able to provide VoIP service through the computer's 32 Internet connection. When the VoIP system is configured in this way, a user is able to place and receive telephone calls nationwide without the analog telephone headset 30 being wired through a PSTN.

Figure 6:
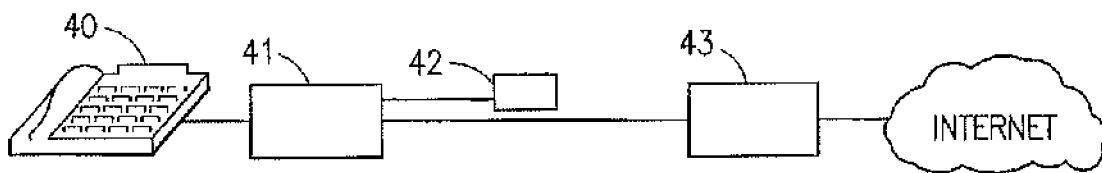
FIG. 6 shows a schematic diagram of the present invention using an Ethernet connection.

Referring now to FIG. 6, the VoIP system that does not require a computer is shown that includes a basic analog telephone handset 40. The analog telephone handset 40 is connected to the ATA 41 through the ATA's 41 telephone port (RJ 11 or compatible). The ATA 41 is shown connected to a USB electric plug adapter 42 through a USB cord that is plugged into one of the ATA's 41 USB ports. The USB electric plug adapter 42 allows the ATA 41 to receive electrical power without a computer connection. The ATA 41 is also shown connected directly to a modem 43 (or router, modem/router combination device and/or a switch) with an Ethernet cord (RJ 45 or compatible) plugged into its Ethernet port. This allows the ATA 41 to access the Internet through the modem 43 without a computer connection. The ATA 41 is able to utilize a direct connection to the Internet through the ATA's 41 NIC component, which is similar to the NIC component found in computers. The NIC component may be on a NIC card or may be on a mainboard or equivalent. When the VoIP system is configured in this way, a user is able to place and receive telephone calls nationwide without the analog telephone handset 40 being wired through a PSTN and even without a wired connection to a computer.

Figure 7:
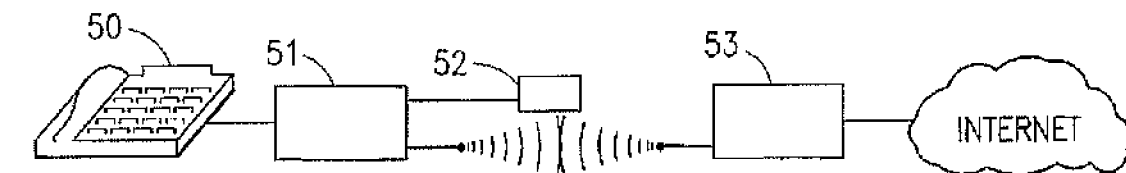
FIG. 7 shows a schematic diagram of the present invention using a Wi-Fi connection.

Referring now to FIG. 7, the VoIP system that does not require a computer is shown that includes a basic analog telephone handset 50. The analog telephone handset 50 is connected to the ATA 51 through the ATA's 51 telephone port (RJ 11 or compatible). The ATA 51 is shown connected to a USB electric plug adapter 52 through a USB cord that is plugged into one of the ATA's 51 USB ports. The USB electric plug adapter 52 allows the ATA 51 to receive electrical power without a computer connection. The ATA 51 is also shown exchanging wireless signals with a wireless router 53. This facilitates the ATA 51 to access the Internet wirelessly through the wireless router 53 without a computer connection or even a wired connection to a modem, router, modem/router combination device and/or a switch. The ATA 51 is able to connect to the wireless signal through the ATA's 51 Wi-Fi adapter and the ATA 51 utilizes the connection to the Internet through the ATA's 51 NIC component, which is similar to the NIC component found in computers. When the VoIP system is configured in this way, a user is able to place and receive telephone calls nationwide without the analog telephone handset 50 being wired through a PSTN and even without the a wired connection to a computer or a modem.

Figure 8:
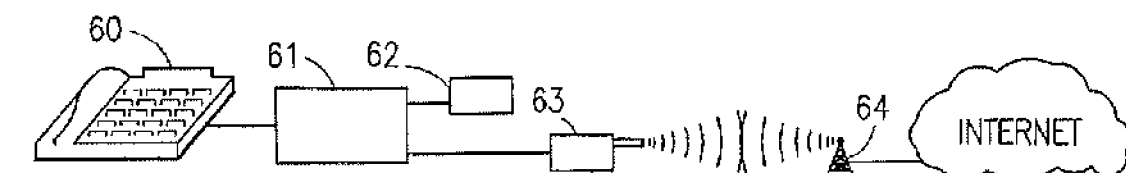
FIG. 8 shows a schematic diagram of the present invention using a USB connection to a cell phone.

Referring now to FIG. 8, the VoIP system that does not require a computer is shown that includes a basic analog telephone handset 60. The analog telephone handset 60 is connected to the ATA 61 through the ATA's 61 telephone port (RJ 11 or compatible). The ATA 61 is shown connected to a USB electric plug adapter 62 through a USB cord that is plugged into one of the ATA's 61 USB ports. The USB electric plug adapter 62 allows the ATA 61 to receive electrical power without a computer connection. The ATA 61 is also shown connected to a cell phone 63 through a USB cord that is plugged into one of the ATA's 61 USB ports. When configured in this manner, the ATA 61 can access the Internet through the cell phone's 63 Internet connection. Generally, it is through a cell phone's 63 connection to the cell phone tower 64, whether the connection is of a GSM, CDMA, or EVDO standard, that the cell phone is able to obtain access to the Internet. However, the ATA 61 can also access the Internet through the cell phone 63 if the cell phone is connecting to the Internet through an available Wi-Fi or WIMAX signal.

Either way, this configuration provides the most flexibility in terms of location and facilitates the ATA 61 to access the Internet wirelessly cell phone 63 without a computer connection, a wired connection to a modem, router, modem/router combination device and/or a switch, or even a nearby Wi-Fi signal. When the VoIP system is configured in this way, a user is able to place and receive telephone calls nationwide without the analog telephone handset 60 being wired through a PSTN and even without the a wired connection to a computer or a modem, or even a WLAN nearby.

Figure 9:
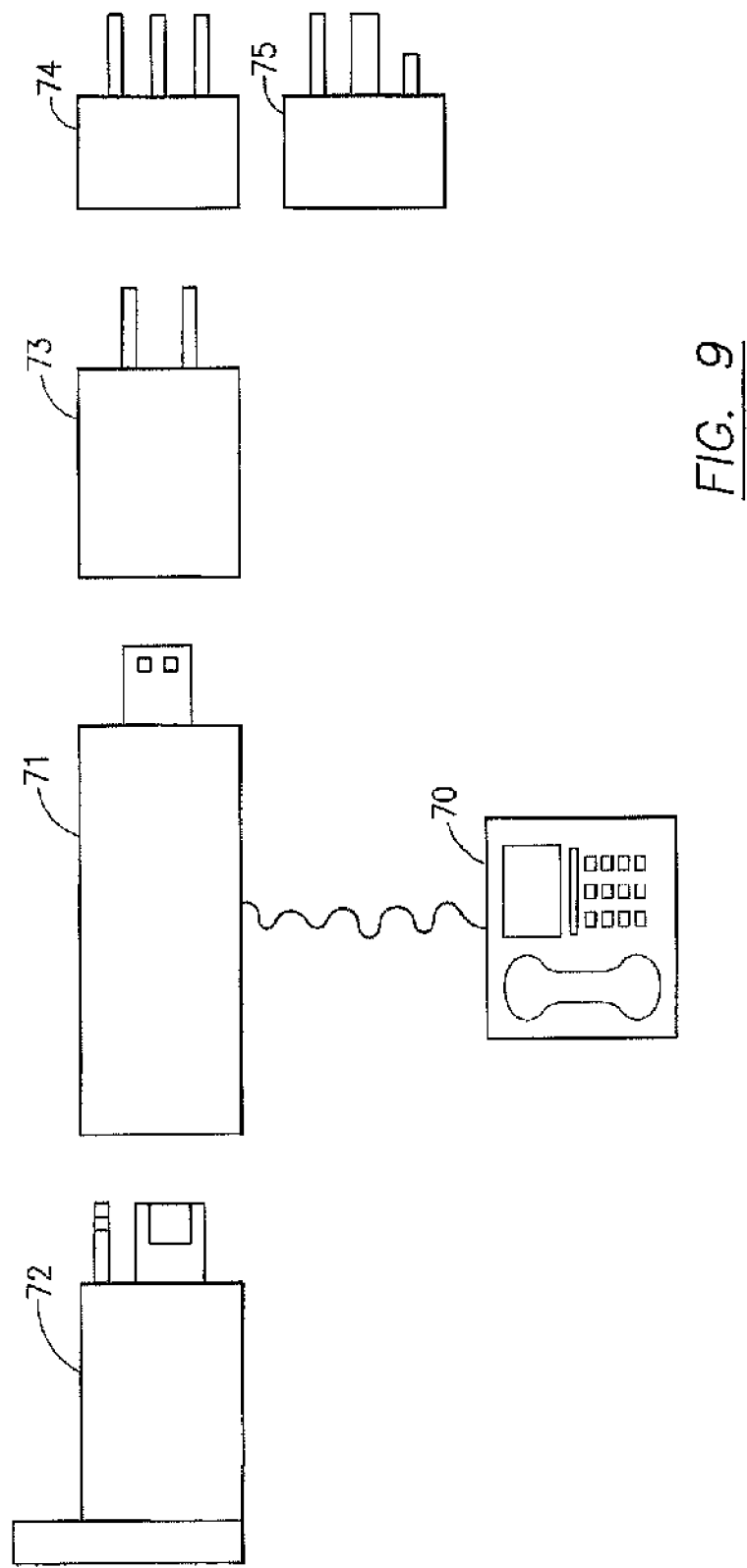
FIG. 9 shows a schematic exploded diagram of the present invention with power connector adapters and power adapters.

Referring now to FIG. 9 the system is shown set up to have the analog phone 70 connected to ATA 71 to include the WI-FI device 72 and a series of power adapters 73, 74, and 75 which are power connector adapters.

Figure 10:
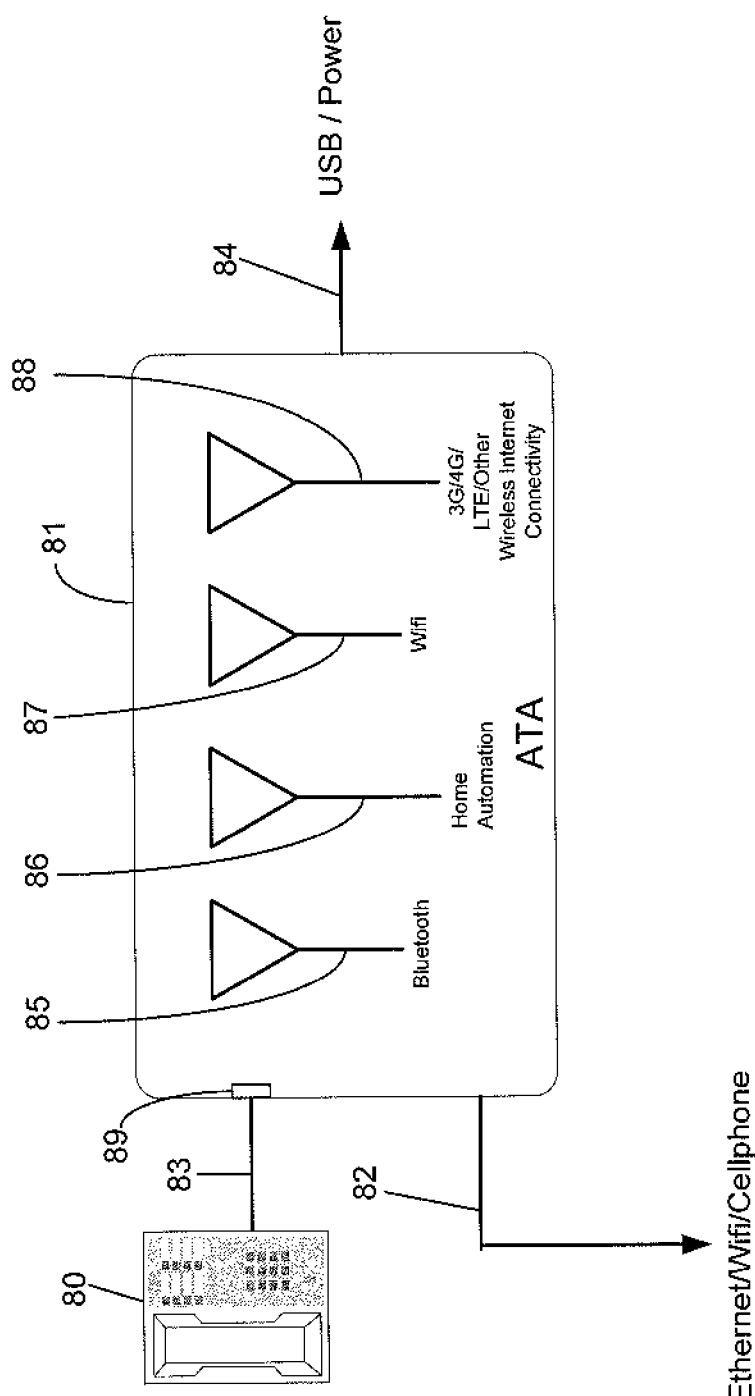
FIG. 10 shows a schematic diagram of an alternative embodiment of the analog telephone adapter of the present invention.

Referring now to FIG. 10, an embodiment of a VoIP system that includes an ATA and does not require a computer but can be used with a computer connected using the USB port 84 is shown that includes a basic analog telephone handset 80. An analog telephone handset 80 or computer may be connected to the ATA 81. The analog telephone handset 80 may be wired to the ATA 81 or connected through the ATA's 81 telephone port (RJ 11 or compatible) 89. The ATA 81 as shown may include an Ethernet connection 82, phone line connection 83, or both. In addition, the ATA includes a power source, and power may be provided via a connection 84 to a USB electric plug adapter through a USB cord that is plugged into one of the ATA's USB ports. A USB electric plug adapter allows the ATA 81 to receive electrical power without a computer connection. The ATA 81 also includes a variety of transceivers for communication via systems such as Bluetooth 85, a wireless home automation network 86, WiFi 87 or cellular telephone service, such as 3G, 4G, LTE or any other similar service known in the art. Thus, the ATA may act as a router or access point for transmitting and receiving signals via 3G, 4G, LTE, WiFi, WiMAX and/or any other known interface.

Figure 11:
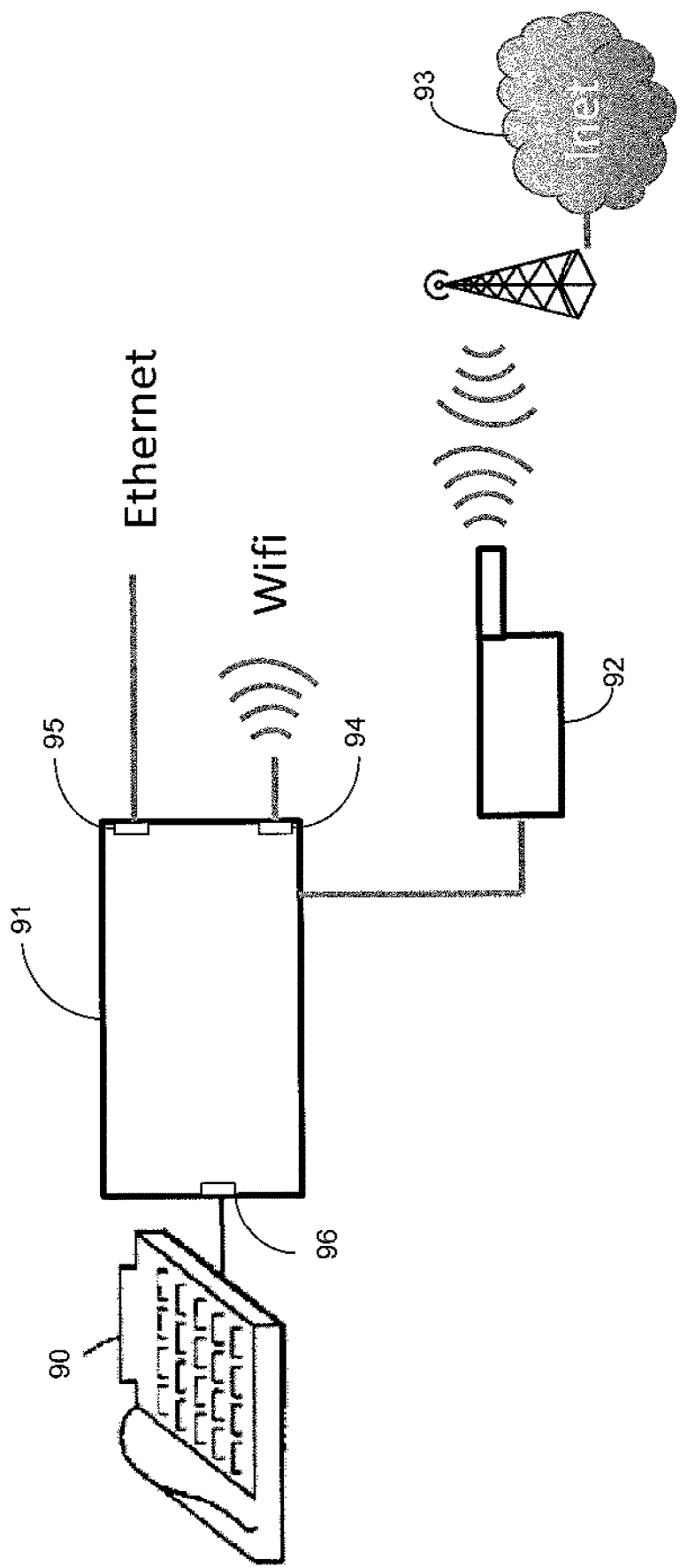
FIG. 11 shows a schematic diagram of the present invention having a plurality of internet connections.
Figure 12:
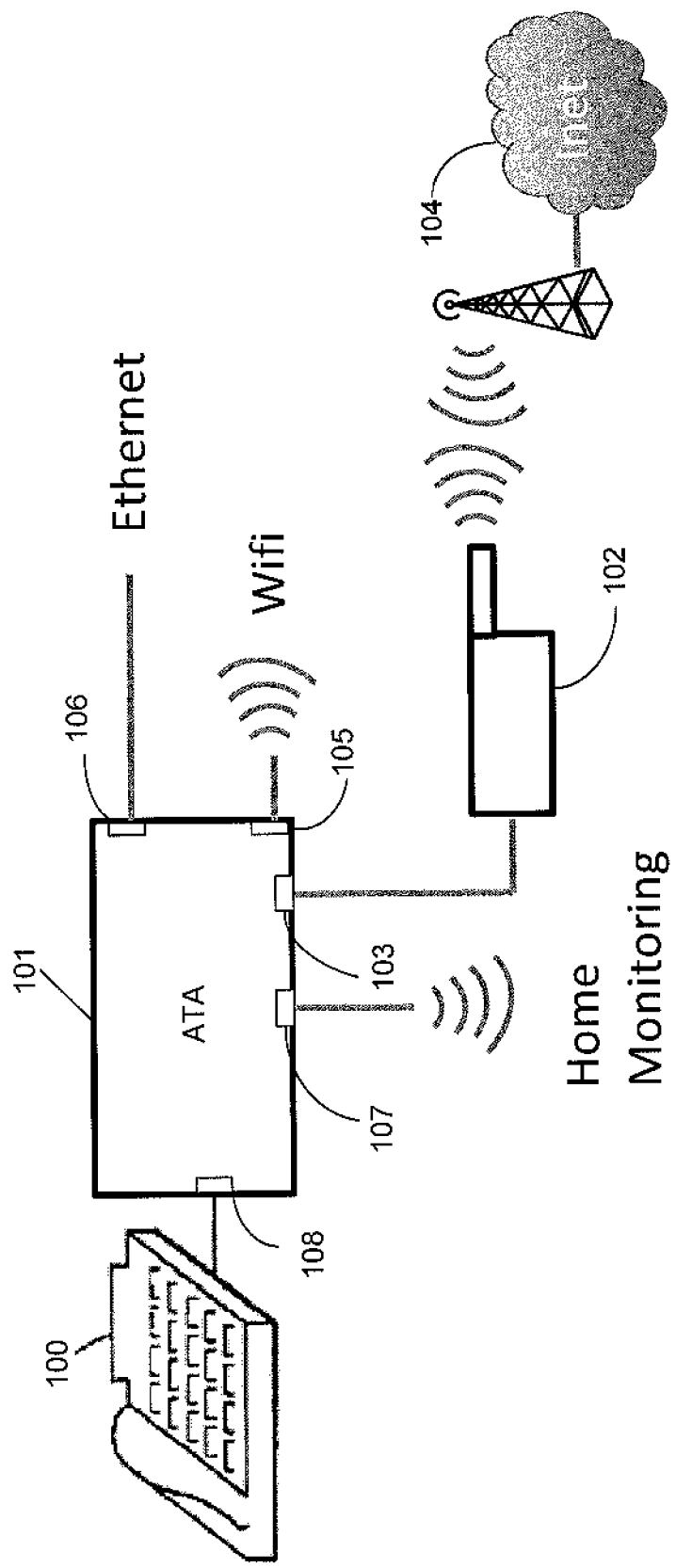
FIG. 12 shows a schematic diagram of the present invention having connectivity with a home monitoring system.
Figure 13:
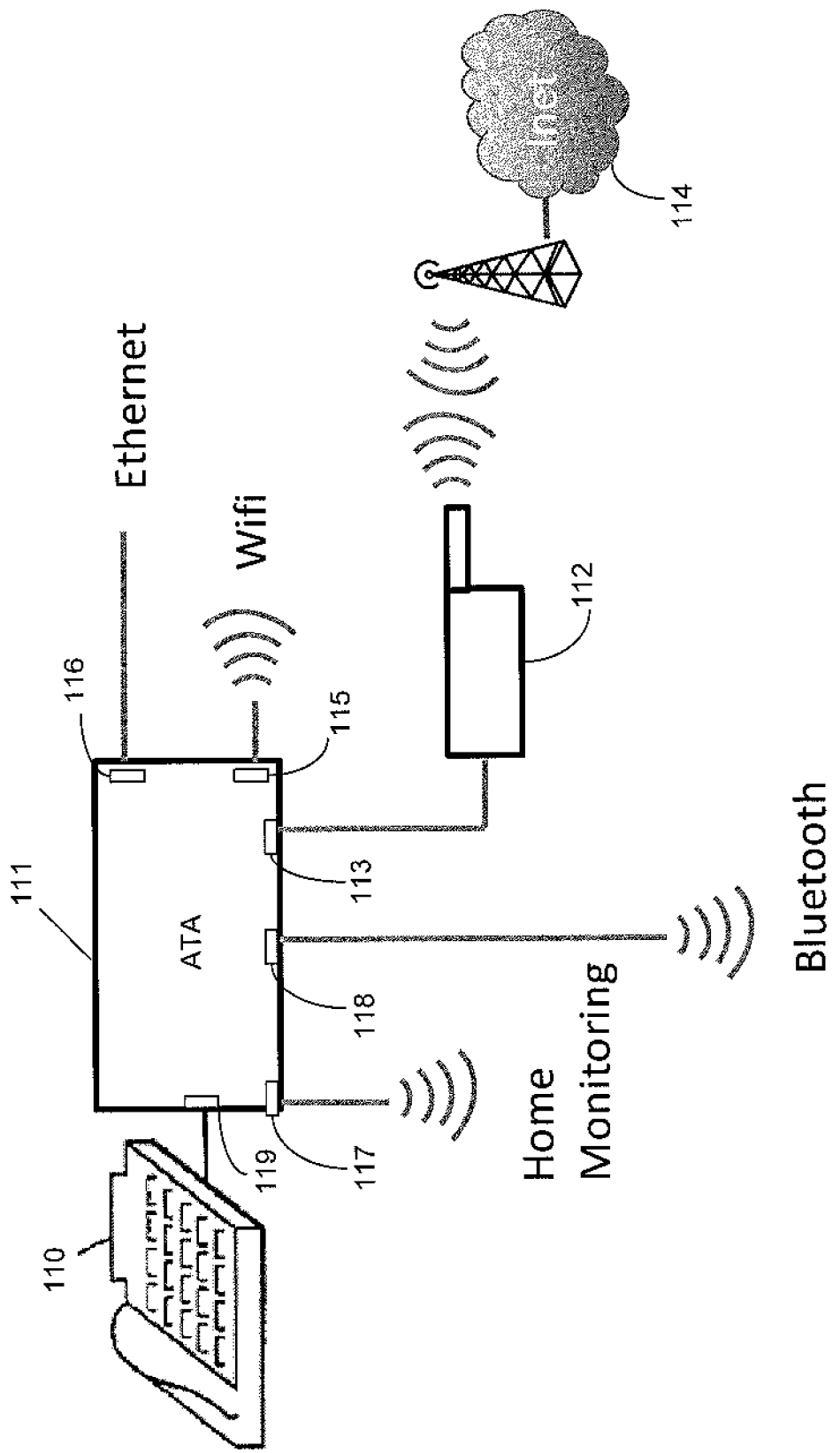
FIG. 13 shows a schematic diagram of the present invention having connectivity with a home monitoring system and Bluetooth connectivity.

Other embodiments of the system of the invention is shown in FIGS. 11-13.

Referring now to FIG. 11, the VoIP system that does not require a computer is shown that includes a basic analog telephone handset 90. The analog telephone handset 90 is connected to the ATA 91 through the ATA's 91 telephone port (RJ 11 or compatible) 96. The ATA 61 is shown connected to a cell phone 92. The connection may be through a USB cord that is plugged into one of the ATA's 91 USB ports. When configured in this manner, the ATA 91 can access the Internet 93 through the cell phone's 92 Internet connection. Generally, connection to the internet may be through a cell phone's 92 connection to the cell phone tower, whether the connection is of a GSM, CDMA, LTE, EVDO, or other standard, that the cell phone is able to obtain access to the Internet. However, the ATA 91 can also access the Internet through the cell phone 92 if the cell phone is connecting to the Internet through an available Wi-Fi or WIMAX signal. Alternatively, the cell phone function may be built into the ATA 91 as shown in FIG. 10. In addition, the ATA may connect to the Internet through the ATA's WiFi adapter 94 or Ethernet port 95.

Referring now to FIG. 12, the VoIP system that does not require a computer is shown that includes a basic analog telephone handset 100. The analog telephone handset 100 is connected to the ATA 101 through the ATA's 101 telephone port (RJ 11 or compatible) 108. The ATA 101 is shown connected to a cell phone 102. The connection may be through a USB cord that is plugged into one of the ATA's 101 USB ports 103. When configured in this manner, the ATA 101 can access the Internet 104 through the cell phone's 102 Internet connection. Generally, connection to the Internet may be through a cell phone's 102 connection to the cell phone tower, whether the connection is of a GSM, CDMA, LTE, EVDO or other standard, that the cell phone is able to obtain access to the Internet. However, the ATA 101 can also access the Internet through the cell phone 102 if the cell phone is connecting to the Internet through an available Wi-Fi or WIMAX signal. Alternatively, the cell phone function may be built into the ATA 101 as shown in FIG. 10. In addition, the ATA may connect to the Internet through the ATA's USB port 103, WiFi adapter 105 or Ethernet port 106.

The ATA may then interface with a home automation sensor, actuator or network, all of which are "home automation network" hereafter, via a wireless interface port 107. The connection to the home automation network may be a 433 MHz or equivalent network, Digital European Cordless Telecommunications (DECT) system, Zigbee or Z-Wave system or other wireless interface to connect with a home automation network, including thermostats or other climate control devices, lighting, or alarm systems. Other elements to a home automation network include two-way cameras, two way voice communication, climate control access and adjustment, including HVAC equipment and fans, alarm setup and monitoring for conditions such as smoke, fire, access violations, perimeter monitoring, motion sensors, remote door commands, and fire suppression system control. In addition, the ATA may work with the home automation network to coordinate scheduled events such as preset lighting and temperature control. The ATA may work with the home automation network to use event triggered macros, such as adding lighting at night when motion occurs in a room, or setting temperature when an alarm has been armed.

The ATA also supports existing Ethernet, USB, and Wifi interfaces to connect the elements of the home automation network with these interfaces. "Home automation network" also includes sensors, actuators and systems for one or more homes, vehicles, business establishments, and the like, in multiples or in combinations.

The Internet connection may be through a USB cord that is plugged into one of the ATA's 101 USB ports 103. When configured in this manner, the ATA 101 can access the Internet 104 through the cell phone's 102 Internet connection. Generally, connection to the internet may be through a cell phone's 102 connection to the cell phone tower, whether the connection is of a GSM, CDMA, LTE, EVDO, or other standard, that the cell phone is able to obtain access to the Internet. However, the ATA 101 can also access the Internet through the cell phone 102 if the cell phone 102 is connecting to the Internet 104 through an available Wi-Fi or WIMAX signal. Alternatively, the cell phone function may be built into the ATA 101 as shown in FIG. 10. In addition, the ATA 101 may connect to the Internet 104 through the ATA's USB 103, Wifi adapter 105 or Ethernet port 106.

Referring now to FIG. 13, another embodiment of a VoIP system that does not require a computer is shown that includes a basic analog telephone handset 110. The analog telephone handset 110 is connected to the ATA 111 through the ATA's 111 telephone port (RJ 11 or compatible) 119. The ATA 111 is shown connected to a cell phone 112. The connection may be through a USB cord that is plugged into one of the ATA's 111 USB ports 113. When configured in this manner, the ATA 111 can access the Internet 114 through the cell phone's 112 Internet connection. Generally, connection to the Internet may be through a cell phone's 102 connection to the cell phone tower, whether the connection is of a GSM, CDMA, LTE, EVDO, or other standard, that the cell phone is able to obtain access to the Internet. However, the ATA 111 can also access the Internet through the cell phone 112 if the cell phone is connecting to the Internet through an available Wi-Fi or WIMAX signal. In addition, the ATA may connect to the Internet through the ATA's USB port 113, WiFi adapter 115 or Ethernet port 116.

The ATA may then interface with a home automation network 117 as described above. The ATA 111 may also have a Bluetooth interface 118. The Bluetooth interface 118 may allow for connection to headsets. In addition, a Bluetooth connection may be made to a telephone handset using CELLLiNK™ or similar technology. With a connection to a Bluetooth handset, the system provides a telephonic connection.

While several connections are described herein, the various permutations of all of the elements of connectivity and communication are also contemplated herein.

The instant invention has been shown and described herein in what is considered to be the most practical and preferred embodiment. It is recognized, however, that departures may be made therefrom within the scope of the invention and that obvious modifications will occur to a person skilled in the art.

The invention claimed is:

1. An analog telephone adapter (ATA) that enables VOID telephony services and is configured to allow a user to gain telephone connectivity between an analog handset and the internet, the ATA comprising:
    a rigid housing including a USB port, an Ethernet port, and a telephone port configured to transmit signals to the analog telephone;
    a processor;
    a non-transitory storage medium; and
    a network interface card;
    the ATA having
        a first configuration wherein the ATA is configured to send communications via the USB port and to relay communications from the telephone port to the USB port to enable telephony services, and
        a second configuration wherein the ATA is configured to send communications via the Ethernet port and to relay communications from the telephone port to the Ethernet port to enable telephony services;
    the non-transitory storage medium having
        a first instruction for the processor to automatically detect communications connectivity at the USB port,
        a second instruction for the processor to automatically detect communications connectivity at the Ethernet port, a third instruction for the processor to automatically configure the ATA into the first configuration upon a determination of communications connectivity at the USB port, and a fourth instruction for the processor to automatically configure the ATA into the second configuration upon a determination of communications connectivity at the Ethernet port.

2. The ATA of claim 1 further comprising the non-transitory storage medium having a fifth instruction for the processor to automatically configure the ATA into the first configuration upon a determination of communications connectivity at both the Ethernet port and communications connectivity at the USB port.

3. The ATA of claim 1 wherein
the second configuration the ATA receives power through a power adapter secured to the USB port; and
wherein the first configuration the USB port of the ATA is secured in a computer.

4. The ATA of claim 1 wherein in the first configuration the ATA is configured to receive communications in a first format from the telephone port and transmit communications in a second format from the USB port; in the second configuration the ATA is configured to receive communications in the first format from the telephone and transmit communications in a third format from the Ethernet port; and the second format is different than the third format.

5. The ATA of claim 1 wherein the USB port communications in the first configuration is independent from the Ethernet port communications in the second configuration.

6. The ATA of claim 5
wherein in the first configuration, the ATA is configured to only transmit communications, from the USB port, that originate from either the telephone port or the non-transitory storage medium,
wherein in the second configuration, the ATA is configured to transmit only communications, from the Ethernet port, that originate from either the telephone port or the non-transitory storage medium.

7. The ATA of claim 1 wherein
the ATA transmits both telephony related communications and home monitoring related communications to the internet.

8. The ATA of claim 1 wherein
the ATA transmits only telephony related communications via the USB port and the Ethernet port.

9. The ATA of claim 8 wherein
the ATA of claim 1 wherein the second configuration wherein the ATA receives power through a series of power adapters secured to the USB port.

10. The ATA of claim 1 wherein the third instruction for the processor is configured to provide plug-in-play functionality and the third instruction for the processor is configured to provide plug-in-play functionality.

11. An analog telephone adapter (ATA) for VoIP telephony services and is configured to allow a user to gain telephone connectivity between a handset and the internet, the ATA comprising:
a rigid body including a USB port, an Ethernet port, a telephone port configured to transmit signals to the handset;
a processor, and a non-transitory storage medium; the ATA having
a first configuration wherein the ATA is configured to relay communications from the telephone port to the USB port to enable telephony services via the internet, wherein all communications sent by the ATA, from the USB port, originate from either the telephone port or the non-transitory storage medium;
a second configuration wherein the ATA is configured to relay communications from the telephone port to the Ethernet port to enable telephony services via the internet;
the non-transitory storage medium having a plug-and-play instruction set for the processor to automatically configure the ATA into the first configuration upon a determination that the USB port enabled as a first active communications interface and automatically configure the ATA into the second configuration upon a determination that the Ethernet port enabled as a second active communications interface;
wherein the first active communications interface is independent of the second active communications interface.

12. The ATA of claim 11 wherein
the ATA is configured to receive electrical power via the USB port in both the first configuration and the second configuration.

13. The ATA of claim 11 wherein the first active communications interface is configured to transmit data using a first transmission protocol, the second active communications interface is configured to transmit data using a second transmission protocol, and the first transmission protocol is distinct from the second transmission protocol.

14. The ATA of claim 11 wherein the first active communications interface is configured to transmit data using a first transmission protocol, the second active communications interface is configured to transmit data using a second transmission protocol, the telephone port is configured to receive data in a third transmission protocol, and the third transmission protocol is distinct from both the first transmission protocol and the second transmission protocol.

15. The ATA of claim 11 wherein a determination that the USB port is enabled as the first active communications interface is exclusive of a determination that the Ethernet port is enabled as the second active communications interface, and a determination that the Ethernet port is enabled as the second active communications interface is exclusive of a determination that the USB port is enabled as the first active communications interface.

16. The ATA of claim 11 wherein the second configuration a series of power adapters secured to the USB port provide electrical power to the ATA.

17. An analog telephone adapter (ATA) that enables VoIP telephony services and is configured to allow a user to gain telephone connectivity between an analog handset and the internet, the ATA comprising:
a rigid housing including a USB port, an Ethernet port, and a telephone port configured to transmit signals to the analog telephone;
a processor;
a non-transitory storage medium; and
a network interface card;
the ATA having
a first configuration wherein the ATA is configured to send communications to the internet via the USB port secured to a computer, and to relay communications from the telephone port to the USB port to enable telephony services, wherein all communications sent by the ATA, from the USB port, originate from either the telephone port or the non-transitory storage medium;
a second configuration wherein the ATA is configured to send communications to the internet via the Ethernet port and to relay communications from the telephone port to the Ethernet port to enable telephony services wherein all communications sent by the ATA, from the Ethernet port, originate from either the telephone port or the non-transitory storage medium;

the non-transitory storage medium having
- a first instruction for the processor to automatically detect communications connectivity at the USB port,
- a second instruction for the processor to automatically detect communications connectivity at the Ethernet port,
- a third instruction for the processor to automatically configure the ATA into the first configuration upon a determination of communications connectivity at the USB port and no communications connectivity at the Ethernet port, and
- a fourth instruction for the processor to automatically configure the ATA into the second configuration upon a determination of communications connectivity at the Ethernet port and no communications connectivity at the USB port.

18. The ATA of claim 17 wherein
the ATA is configured to receive electrical power via the USB port in both the first configuration and the second configuration,
wherein the first configuration the ATA is configured to receive electrical power from the computer secured to the USB port, and
wherein the second configuration the ATA is configured to receive power from at least one power adapter electrically connected to the USB port.

19. The ATA of claim 18 further comprising
a power cord with a USB connector, the power cord configured to provide electrical power from the power adapter to the USB port when the ATA is in the second configuration.

20. The ATA of claim 19 wherein
the power cord is configured to be disconnected from the USB port when the ATA is in the first configuration.

* * * * *